United States Patent [19]  
Endoh et al.

[11] Patent Number: 4,630,124
[45] Date of Patent: Dec. 16, 1986

[54] QUALITY SELECTABLE FACSIMILE IMAGE CODING SYSTEM

[75] Inventors: Toshiaki Endoh, Tanashi; Yasuhiro Yamazaki, Hiratsuka, both of Japan

[73] Assignee: Kokusai Denshin Denwa Kabushiki Kasiha, Tokyo, Japan

[21] Appl. No.: 680,298

[22] Filed: Dec. 11, 1984

[30] Foreign Application Priority Data

Dec. 15, 1983 [JP] Japan ................................ 58-235023

[51] Int. Cl.⁴ .......................................... H04N 1/417
[52] U.S. Cl. .................................. 358/260; 358/263; 358/133
[58] Field of Search ............... 358/260, 261, 263, 133, 358/152, 138, 105

[56] References Cited

U.S. PATENT DOCUMENTS 4,222,076 9/1980 Knowlton ........................ 358/263
4,261,018 4/1981 Knowlton .......................... 358/263
4,414,580 11/1983 Johnsen et al. ..................... 358/260

Primary Examiner—John W. Shepperd
Assistant Examiner—John K. Peng
Attorney, Agent, or Firm—Robert E. Burns; Emmanuel J. Lobato; Bruce L. Adams

[57] ABSTRACT

A facsimile signal coding system is disclosed, in which initial encoding is performed for detecting, from picture elements forming a facsimile picture signal, picture elements at intervals of $\Delta X$ picture elements on every $\Delta Y$th line and encoding the detected picture elements. Encoding of mode 1 is carried out for encoding, by referring to four of the encoded picture elements, a picture element surrounded by the reference picture elements and lying centrally thereof. Encoding of mode 2 is performed by encoding, by referring to four picture elements encoded by the initial encoding and the encoding of mode 1, a picture element surrounded by the four picture elements lying above and below it and on its left and right. The initial encoding and the encoding of mode 1 and mode 2 are effected using $2^n$ (where n is an integer) as an initial value of each of the $\Delta X$ and $\Delta Y$ and thereafter the encoding operations of mode 1 and mode 2 are repeated with the values of the $\Delta X$ and $\Delta Y$ reduced by half.

2 Claims, 22 Drawing Figures

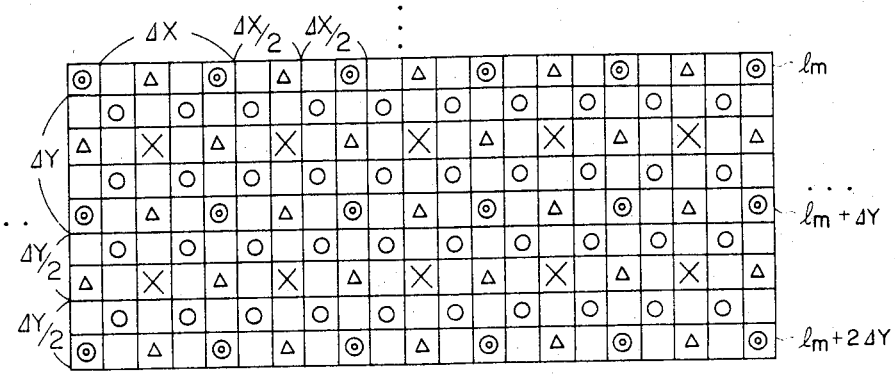
Fig. 1
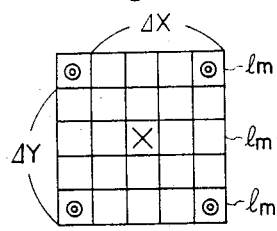
Fig. 2
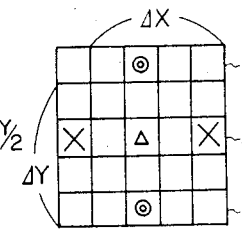
Fig. 3A
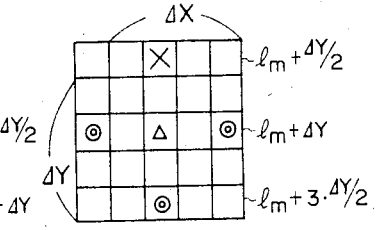
Fig. 3B
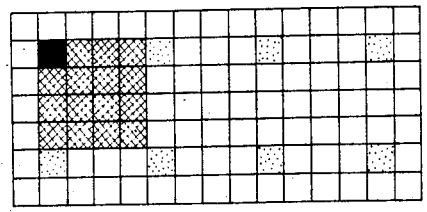
Fig. 7A
Fig. 7B
Fig. 7C

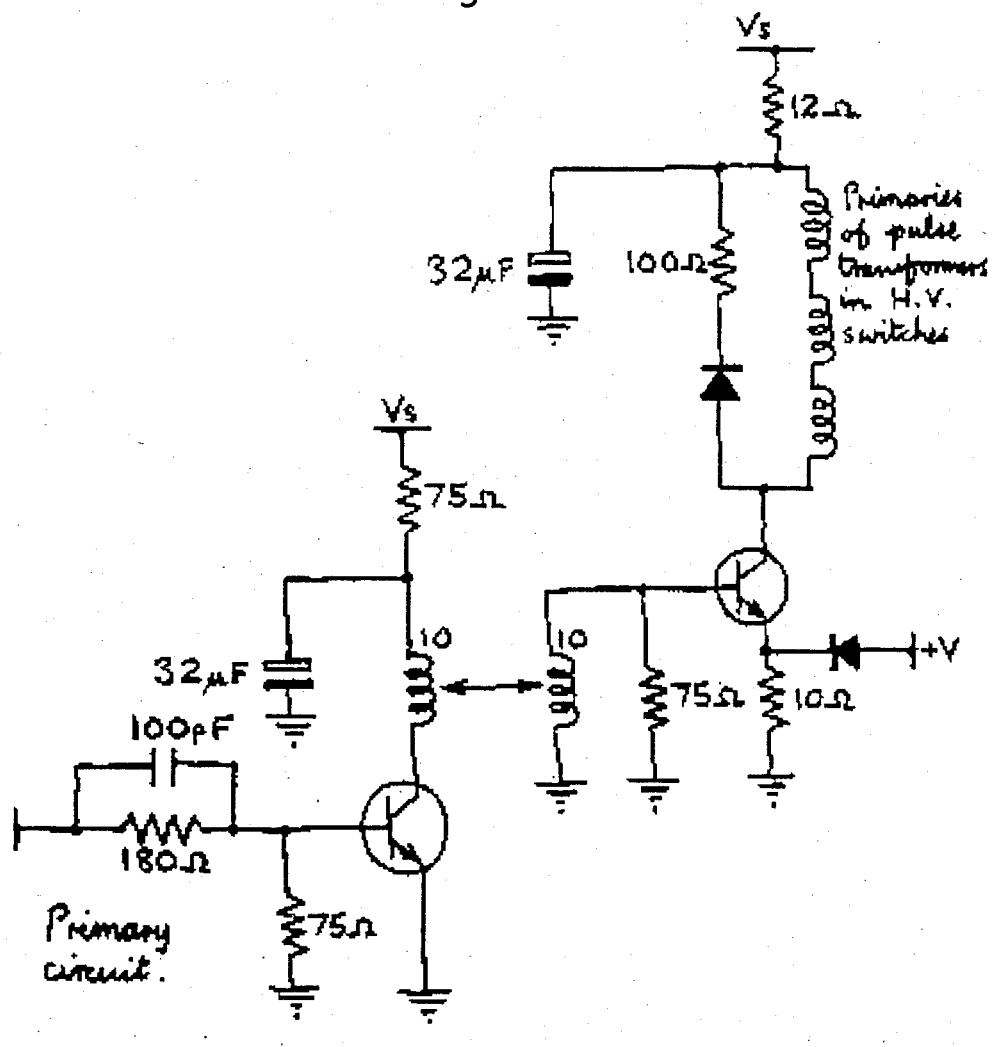

QUALITY SELECTABLE FACSIMILE IMAGE CODING SYSTEM

BACKGROUND OF THE INVENTION

The present invention relates to a facsimile signal coding system which permits the receiving station to freely select the quality of a reproduced image, and more particularly to a facsimile signal coding system which is of particular utility when employed in conversational image communication or image data base retrieval which combines a facsimile terminal with a display unit.

Conventional facsimile communication is paper-to-paper communication and is usually intended to obtain a hard copy. However, there is a tendency that the demand for image processing will be diversified in the future, but at present, the prior art does not possess functions which cope with such a situation.

SUMMARY OF THE INVENTION

It is therefore an object of the present invention to provide a facsimile picture coding system which obviates such a defect of the prior art and is able to meet with the demand for image processing which will be diversified.

In accordance with the present invention, there is provided a facsimile signal coding system, characterized by the provision of initial encoding means for detecting, from picture elements forming a facsimile picture signal, picture elements at intervals of $\Delta X$ picture elements on every $\Delta Y$th line and encoding the detected picture elements; encoding means of mode 1 for encoding, by referring to four of the encoded picture elements, a picture element surrounded by the reference picture elements and lying centrally thereof; and encoding means of mode 2 for encoding, by referring to four picture elements encoded by the initial encoding means and the encoding means of mode 1, a picture element surrounded by the four picture elements lying above and below it and on its left and right; wherein the initial encoding and the encoding of mode 1 and mode 2 are effected using $2^n$ (where n is an integer) as an initial value of each of the $\Delta X$ and $\Delta Y$ and thereafter the encoding operations of mode 1 and mode 2 are repeated with the values of the $\Delta X$ and $\Delta Y$ reduced by half.

It is considered that the diversification of facsimile communication will involve the combined use of a facsimile terminal and a display unit for conversational image communication and video data base retrieval.

In such conversational image communication, for realizing a smooth conversation in the case of graphic information having a large amount of data, a progressive coding system which provides a rough display of the entire image on a display in as early a stage as possible and then gradually improves the picture quality is more effective than a conventional image coding system which successively reproduces complete pictures along scanning lines from the top to the bottom of the image.

With the sequential progressive coding system, the receiver can decide, from the rough display, whether the information being transmitted is the desired one, and if not, he can stop the subsequent unnecessary data transmission. If the information is the desired one, then its image quality is raised to be sufficiently high, and if necessary, a hard copy of the picture at that time can also be obtained. Thus, the progressive coding system is a coding system that permits the selection of picture quality, a rapid retrieval and curtailment of communication costs, and hence is suitable for conversational visual communication.

BRIEF DESCRIPTION OF THE DRAWINGS

The present invention will be described in detail below with reference to the accompanying drawings, in which:

FIGS. 1, 2, 3A, 3B, 4A, 4B, 4C, 4D, 5A, 5B, 5C and 5D are picture element arrangement patterns explanatory of the principles of the present invention;

FIGS. 6A, 6B, 6C, 6D and 6E are diagrams showing examples of received pictures of encoded signals by the present invention;

FIGS. 7A, 7B and 7C show examples of interpolation processing used in the present invention;

DETAILED DESCRIPTION

Figure 4A:
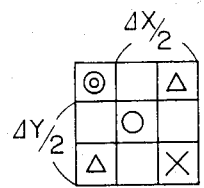
Figure 4B:
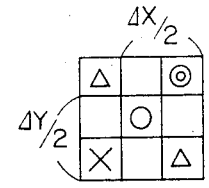
Figure 4C:
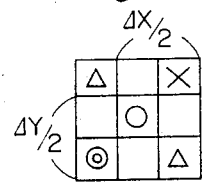
Figure 4D:
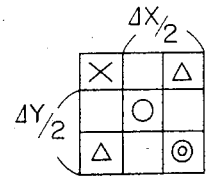
Figure 5A:
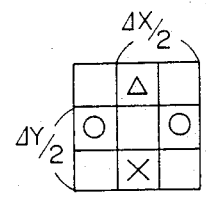
Figure 5B:
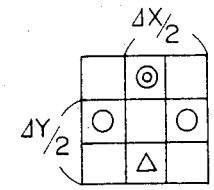
Figure 5C:
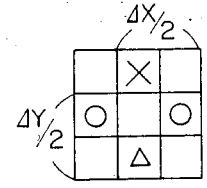
Figure 5D:
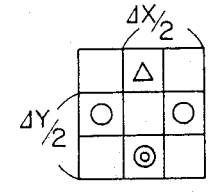
Figure 6A:
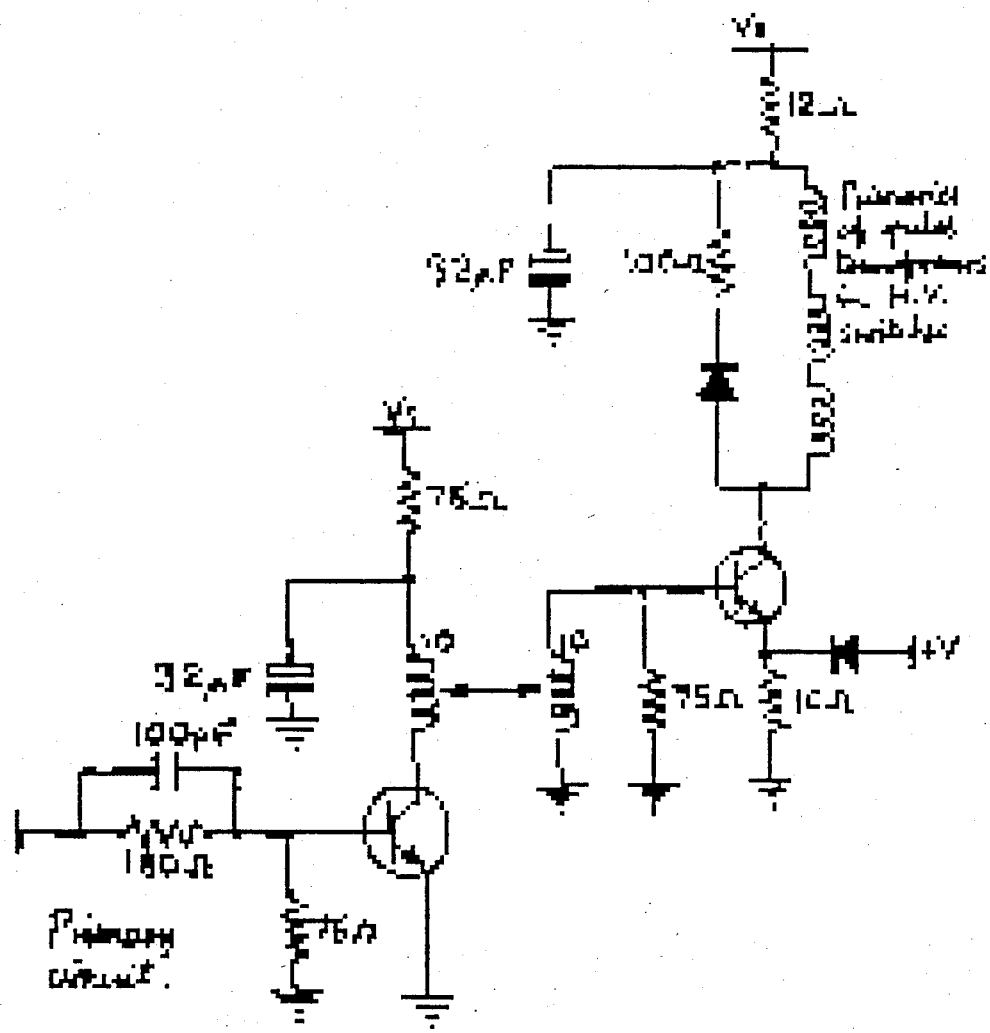
Figure 6C:
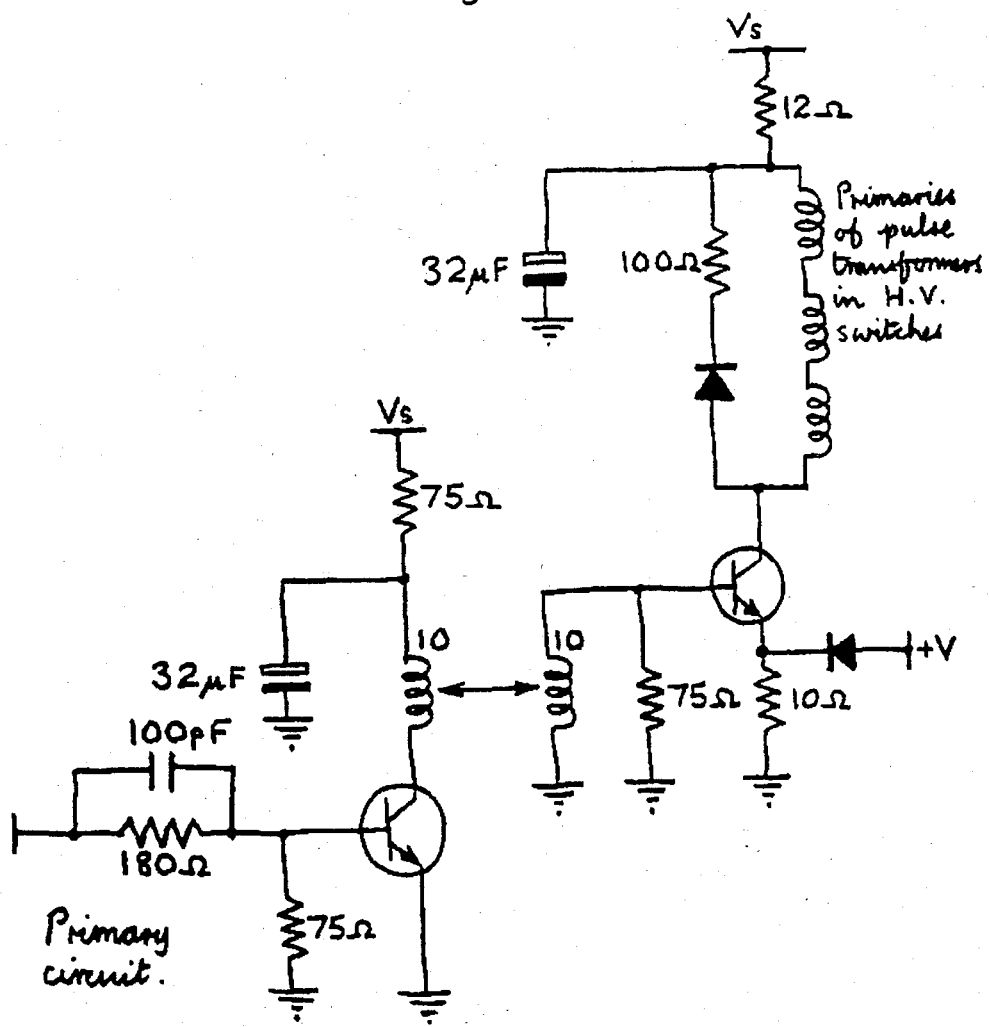
Figure 6D:
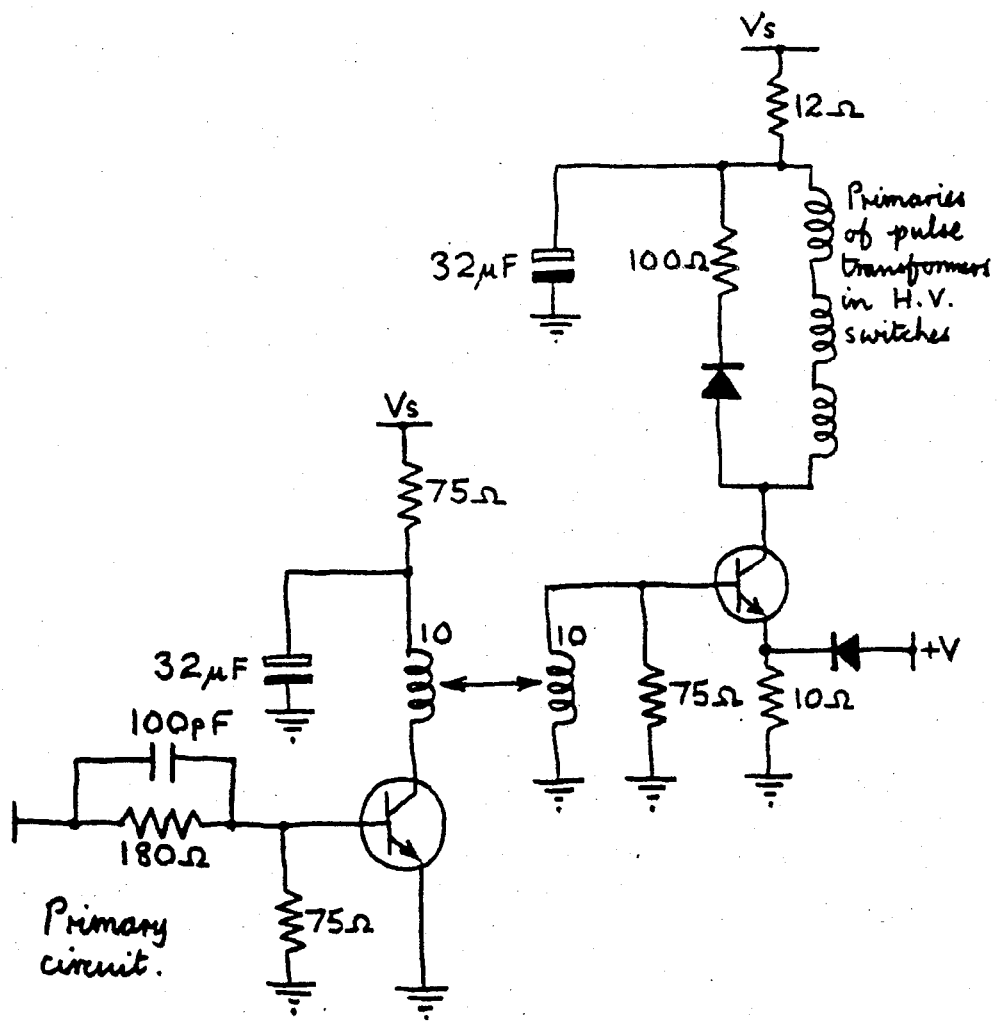
Figure 6E:
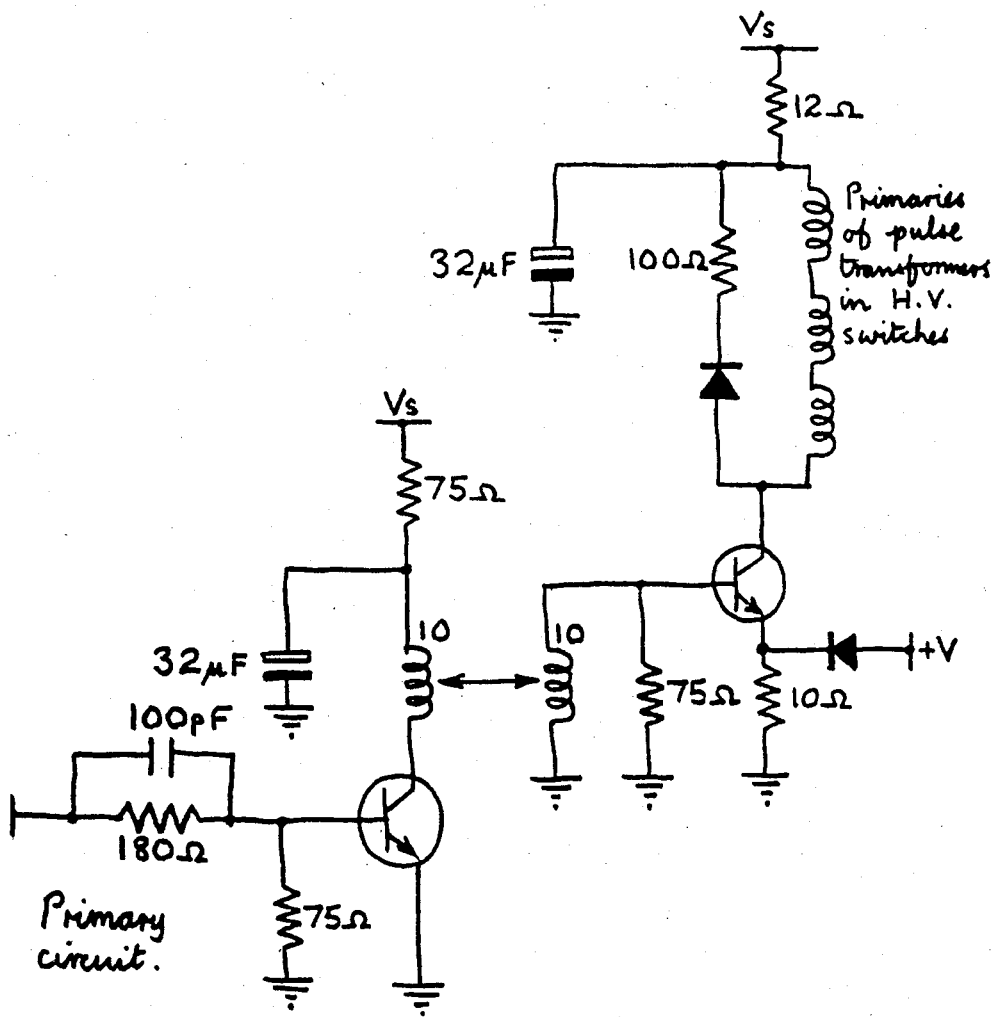

With reference to FIGS. 1 to 5, the picture element coding sequence according to the present invention will first be described. FIG. 1 is a diagrammatic showing of nine lines $l_m$ to $l_{m+2\Delta Y}$ extracted from a certain part of a picture element signal.

(i) According to the present invention, picture elements marked with double circles, which are spaced apart $\Delta X = 2^n$ (where n = 1, 2, 3, ...) picture elements in a lateral direction (on scanning lines) and $\Delta Y = 2^n$ (where n = 1, 2, 3, ) picture elements in a vertical direction, are extracted, and they are linked together without being divided for each line and encoded into run-length codes. FIG. 1 shows a case where n=2, that is, where every four picture elements are extracted on every fourth line.

(ii) Next, picture elements marked with crosses are encoded and in this case, the picture elements marked with double circles are referred to. That is to say, for the encoding of the cross-marked picture elements, four already-coded double-circled picture elements are referred to which are spaced apart from the cross-marked picture element by $\Delta X/2$ in the lateral direction and $\Delta Y/2$ in the vertical direction. What is intended to mean by "referred to" is to judge the amount of information which is given to the quality of the cross-marked picture element to be encoded. The four double-circled reference picture elements assume the following five statuses:

Status 0: the four picture elements are all white picture elements.

Status 1: only one of the four picture element is a black picture element.

Status 2: two of the four picture elements are black picture elements.

Status 3: three of the four picture elements are black picture elements

Status 4: the four picture elements are all black picture elements.

Of the above statuses, the cross-marked picture element in the status 2 is considered to correspond to the contour of an image since two picture elements are white, and the picture quality is greatly affected depending upon whether the cross-marked picture element lying at the center is white or black. Accordingly, if the cross-marked picture element in the status 2 is coded and transmitted prior to the other picture elements, then the picture quality at the receiving side can be markedly improved. From such a point of view, according to the present invention, picture elements are encoded in the order of status 2—status 3—status 1—status 4—status 0.

In the status 0 and the status 4, if an interpolation process (a sort of prediction) is carried out at the receiving side, then it is very likely that the cross-marked picture element is interpolated to white in the status 0 and to black in the status 4; therefore, its encoding may also be omitted in some cases.

The mode of encoding in a case where the double-circled picture elements lie at the four corners of the square, as shown in FIG. 2, will hereinafter be referred to as the mode 1, and this mode for each status N (where N=0, ..., 5) will hereinafter be called the mode 1-N.

(iii) Next, picture elements marked with triangles in FIG. 1 are each encoded by referring to the double-circled and cross-marked picture elements already encoded. In this case, the reference picture elements lie above and below the triangle-marked picture element to be encoded and on the right and the left thereof at distances therefrom of $\Delta X/2$ and $\Delta Y/2$, as shown in FIGS. 3A and 3B. The statuses which the reference picture elements can assume are the same as the aforementioned statuses 0 to 4, and the encoding sequence for the triangle-marked picture elements, taking into account the statuses of the reference picture elements, is also the same as described above. The mode of encoding in each status will hereinafter be referred to as the mode 2-N (where N=0, ..., 4).

(iv) Next, picture elements marked with single circles in FIG. 1 are encoded. FIGS. 4A, 4B, 4C and 4D show the patterns of reference picture elements in the case of the mode 1, and the reference picture elements lie distant $\Delta X/2$ and $\Delta Y/2$ from the single-circled picture element to be encoded. That is to say, it is necessary only to reduce the distance of extraction of the reference picture elements by half in the procedure of encoding the cross-marked picture elements.

(v) Finally, blank picture elements in FIG. 1 are encoded. FIGS. 5A, 5B, 5C and 5D show the patterns of reference picture elements in this case. In the encoding mode 2, the distance from the picture element to be encoded to each reference picture element is ½ that in the case of encoding the triangle-marked picture element.

The encoding operations in the mode 1 and the mode 2 are repeated, with the intervals between the reference picture elements reduced by half, as described above. When the intervals between them becomes $2^1$, it means completion of the encoding of all picture elements. Values $\Delta X$ and $\Delta Y$ define the intervals between reference picture elements in the horizontal and vertical directions.

While in the example shown in FIG. 1 the values $\Delta X$ and $\Delta Y$ are selected so that $2^2=4$, the value n in the $2^n$ is arbitrarily selectable. Further, the $\Delta X$ and $\Delta Y$ need not always be set to the same value; namely, it is necessary only that when the interval between the reference picture elements becomes 2, the interval between reference picture in that direction is fixed to 2 and the encoding in the mode 1 and the mode 2 is carried out until the interval between reference picture elements in the other direction becomes 2.

Details of the above-described coding procedures are as follows:

Procedure 1-1: $\Delta X$ and $\Delta Y$ are determined by $2^n$ (where n=1, 2, 3, 4, ...)

Procedure 1-2: Letting the coordinates of picture elements be represented by P (X·$\Delta X$+1, Y·$\Delta Y$+1) (where X, Y=0, 1, ...), the picture elements P are linked together from left to right and top to bottom without being divided for each line, and they are encoded into run-length codes.

Procedure 1-3: Encoding takes place in accordance with algorithms shown in Procedures 2-1 to 2-10 described later.

Procedure 1-4: $\Delta X$ is set to $\Delta X/2$, and $\Delta Y$ is set to $\Delta Y/2$.

Procedure 1-5: If $\Delta X$ and $\Delta Y$ are both 1 (2 at the end of the Procedure 1-3), then encoding is finished, and if not, the operation proceeds to the Procedure 1-3.

Procedures 2-1 to 2-10 are as follows:

Procedure 2-1: Picture elements in the mode 1-2 are encoded. All picture elements which are in the mode 1-2 are all linked together one after another without being divided for each line, and they are encoded into run-length codes. The encoding is effected on the assumption, as an initial condition, that a black picture element in the mode 1-2 virtually exists at the head of the picture.

Procedure 2-2: Picture elements in the mode 1-3 are encoded. All picture elements which are in the mode 1-3 are all linked together one after another without being divided for each line, and they are encoded into run-length codes. The encoding is effected on the assumption, as an initial condition, that a black picture element in the mode 1-3 virtually exists at the head of the picture.

Procedure 2-3: Picture elements in the mode 1-1 are encoded. All picture elements which are in the mode 1-1 are all linked together one after another without being divided for each line, and they are encoded into run-length codes. The encoding is effected on the assumption, as an initial condition, that a white picture element in the mode 1-1 virtually exists at the head of the picture.

Procedure 2-4: Picture elements in the mode 1-4 are encoded. All picture elements which are in the mode 1-4 are all linked together one after another without being divided for each line, and they are encoded into run-length codes. The encoding is effected on the assumption, as an initial condition, that a black picture element in the mode 1-4 virtually exists at the head of the picture.

Procedure 2-5: Picture elements in the mode 1-5 are encoded. All picture elements which are in the mode 1-0 are all linked together one after another without being divided for each line, and they are encoded into run-length codes. The encoding is effected on the assumption, as an initial condition, that a white picture element in the mode 1-0 virtually exists at the head of the picture.

Procedure 2-6: Picture elements in the mode 2-2 are encoded. All picture elements which are in the mode 2-2 are all linked together one after another without being divided for each line, and they are encoded into run-length codes. The encoding is effected on the assumption, as an initial condition, that a black picture element in the mode 2-2 virtually exists at the head of the picture.

Procedure 2-7: Picture elements in the mode 2-3 are encoded. All picture elements which are in the mode 2-3 are linked together one after another without being divided for each line, and they are encoded into run-length codes. The encoding is effected on the assumption, as an initial condition, that a black picture element in the mode 2-3 virtually exists at the head of the picture.

Procedure 2-8: Picture elements in the mode 2-1 are encoded. All picture elements which are in the mode 2-1 are linked together one after another without being divided for each line, and they are encoded into run-length codes. The encoding is effected on the assumption, as an initial condition, that a white picture element in the mode 2-1 virtually exists at the head of the picture.

Procedure 2-9: Picture elements in the mode 2-4 are encoded. All picture elements which are in the mode 2-4 are linked together one after another without being divided for each line, and they are encoded into run-length codes. The encoding is effected on the assumption, as an initial condition, that a black picture element in the mode 2-4 virtually exists at the head of the picture.

Procedure 2-10: Picture elements in the mode 2-0 are encoded. All picture elements which are in the mode 2-0 are linked together one after another without being divided for each line, and they are encoded into run-length codes. The encoding is effected on the assumption, as an initial condition, that a white picture element in the mode 2-0 virtually exists at the head of the picture.

Next, codes for use in each encoding procedure will be exemplified. A code assignment table for use in Procedure 1-2 is shown in Table 1.

TABLE 1

| ΔX × ΔY | code table white run | black run |
|---|---|---|
| 16 × 16 | WYLE | 1–2 |
| 8 × 8 | WYLE | 1–2 |
| 4 × 4 | 1–2 | 1–2 |
| 2 × 2 | WYLE | MH (W) |

In Table 1, MH(W) means a code for a white run of the MH coding system, and WYLE known WYLE codes. Table 2 shows terminating codes of MH(W), Table 3 makeup codes and Table 4 WYLE codes.

Incidentally, N-2 (where N is an integer) in Table 1 is a code peculiar to the present invention. The N-2 code tables is provided as follows. If the run-length is included in the range of 1 to $2^N-1$ pels, N bits are used as the code words. On the other hand, if the run-length is included in the range of $2^M+2^N-2$ to $2^{M+1}+2^N-3$, $M+N\times 2$ bits are used as the code words (where M is an integer). Table 5 shows its example.

TABLE 2

| Run length | MH (W) |
|---|---|
| 0 | 00110101 |
| 1 | 000111 |
| 2 | 0111 |
| 3 | 1000 |
| 4 | 1011 |
| 5 | 1100 |
| 6 | 1110 |
| 7 | 1111 |
| 8 | 10011 |
| 9 | 10100 |
| 10 | 00111 |
| . | . |
| . | . |
| . | . |
| 60 | 01001011 |
| 61 | 00110010 |
| 62 | 00110011 |
| 63 | 00110100 |

TABLE 3

| Run length | MH (W) |
|---|---|
| 64 | 11011 |
| 128 | 10010 |
| 192 | 010111 |
| 256 | 0110111 |
| 320 | 00110110 |
| . | . |
| . | . |
| . | . |
| 1600 | 010011010 |
| 1664 | 011000 |
| 1728 | 010011011 |
| ELO | 000000000001 |

TABLE 4

| Run length | WYLE CODE (* is a binary number) |
|---|---|
| 1 to 2 | 0* |
| 3 to 6 | 10** |
| 7 to 14 | 110*** |
| 15 to 30 | 1110**** |
| 31 to 62 | 11110***** |
| . | . |
| . | . |
| . | . |

TABLE 5

| Run length | 1-2 code (* is a binary number) |
|---|---|
| 1 | 0 |
| 2 to 3 | 10* |
| 4 to 7 | 110** |
| 8 to 15 | 1110*** |
| 16 to 31 | 11110**** |
| 32 to 63 | 111110***** |
| . | . |
| . | . |
| . | . |

TABLE 6

| ΔX × ΔY | mode white, black | status 0 | status 1 | status 2 | status 3 | status 4 |
|---|---|---|---|---|---|---|
| 16 × 16 | 1-white- | MH(W) | 2-2 | 1-2 | NON | 1-2 |
| 16 × 16 | 1-black- | 1-2 | 1-2 | 1-2 | NON | WYLE |
| 16 × 16 | 2-white- | MH(W) | SYLE | 1-2 | 1-2 | 1-2 |
| 16 × 16 | 2-black- | 1-2 | 1-2 | 2-2 | 1-2 | 1-2 |
| 8 × 8 | 1-white- | MH(W) | 1-2 | 1-2 | 1-2 | 1-2 |
| 8 × 8 | 1-black- | 1-2 | 1-2 | 1-2 | 1-2 | 1-2 |
| 8 × 8 | 2-white- | WYLE | WYLE | 1-2 | 1-2 | 1-2 |
| 8 × 8 | 2-black- | 1-2 | 1-2 | 1-2 | 2-2 | WYLE |
| 4 × 4 | 1-white- | WYLE | 1-2 | NON | 1-2 | 1-2 |
| 4 × 4 | 1-black- | 1-2 | 1-2 | NON | 1-2 | WYLE |
| 4 × 4 | 2-white- | 11-2 | WYLE | NON | 1-2 | 1-2 |
| 4 × 4 | 2-black- | 1-2 | 1-2 | NON | WYLE | WYLE |
| 2 × 2 | 1-white- | WYLE | WYLE | 1-2 | 1-2 | 1-2 |
| 2 × 2 | 1-black- | 1-2 | 1-2 | 1-2 | WYLE | 8-2 |
| 2 × 2 | 2-white- | WYLE | WYLE | NON | 1-2 | 1-2 |
| 2 × 2 | 2-black- | 1-2 | 1-2 | NON | WYLE | 11-2 |

TABLE 7

| CCITT TEST DOCUMENT NO. | First ΔX ( = ΔY ) | | | | Number of coded bits of MR (K = ∞) |
| --- | --- | --- | --- | --- | --- |
| | 16 | 8 | 4 | 2 | |
| DOC 1 | <u>131085</u> | <u>131054</u> | <u>132911</u> | 152328 | 144814 |
| DOC 2 | <u>76814</u> | <u>78711</u> | 92356 | 122599 | 86416 |
| DOC 3 | <u>221487</u> | <u>223109</u> | 236982 | 287196 | 229640 |
| DOC 4 | <u>496316</u> | <u>495728</u> | <u>497168</u> | 556327 | 554185 |
| DOC 5 | <u>248863</u> | <u>249230</u> | 260056 | 309152 | 257765 |
| DOC 6 | 144635 | 147215 | 164920 | 212803 | 133197 |
| DOC 7 | <u>526604</u> | <u>526584</u> | <u>541118</u> | 607301 | 554245 |
| DOC 8 | <u>142399</u> | <u>148805</u> | <u>146404</u> | 256153 | 152784 |
| Average | <u>248525</u> | <u>250055</u> | <u>258989</u> | 312982 | 264131 |

Codes for Procedure 1-3 are used properly in accordance with the code assignment on Table 6. On the Table 6, NON means the encoding of white of a picture signal into a "0" and black into a "1".

Table 7 shows, for comparison with each other, the numbers of coding bits by the coding system of the present invention employing the above shown code tables and by an MR (k=∞) system which is a known coding system. CCITT test documents 1 to 8 were used as images. In the system of the present invention, a condition: ΔX=ΔY is established and the comparison operation was made in connection with four cases in which their initial values were set to 2, 4, 8 and 16. In Table 7, underlined values indicate the cases where efficiency of the coding system of the present invention is higher than that of the MR system. From Table 7, it appears that by setting the initial value of ΔX (=ΔY) to 16 or 8, efficiency is improved 3 to 11% for the test documents except DOC6.

FIGS. 6A, 6B, 6C, 6D and 6E show examples of received images, along with the lapse of time after the start of reception. The transmission rate used is 9600 BPS, and FIGS. 6A, 6B, 6C, 6D and 6E show the cases of elapsed times of 1.0, 2.1, 4.0, 5.8 and 8 seconds, respectively. In this case, the encoding of an image shown in FIG. 7A involves such an interpolation process that at the time of decoding undecoded picture elements shown in FIG. 7C after dotted and painted-out decoded picture elements shown in FIG. 7B, the hatched undecoded picture element was painted out in the same manner as the left upper painted-out decoded picture element. This interpolation process is not requisite, and hence need not always be effected, and it may also be substituted with another method.

Next, a description will be given, with reference to FIGS. 8 and 9, of an example of the circuit arrangement which implements the coding system of the present invention.

Figure 8:
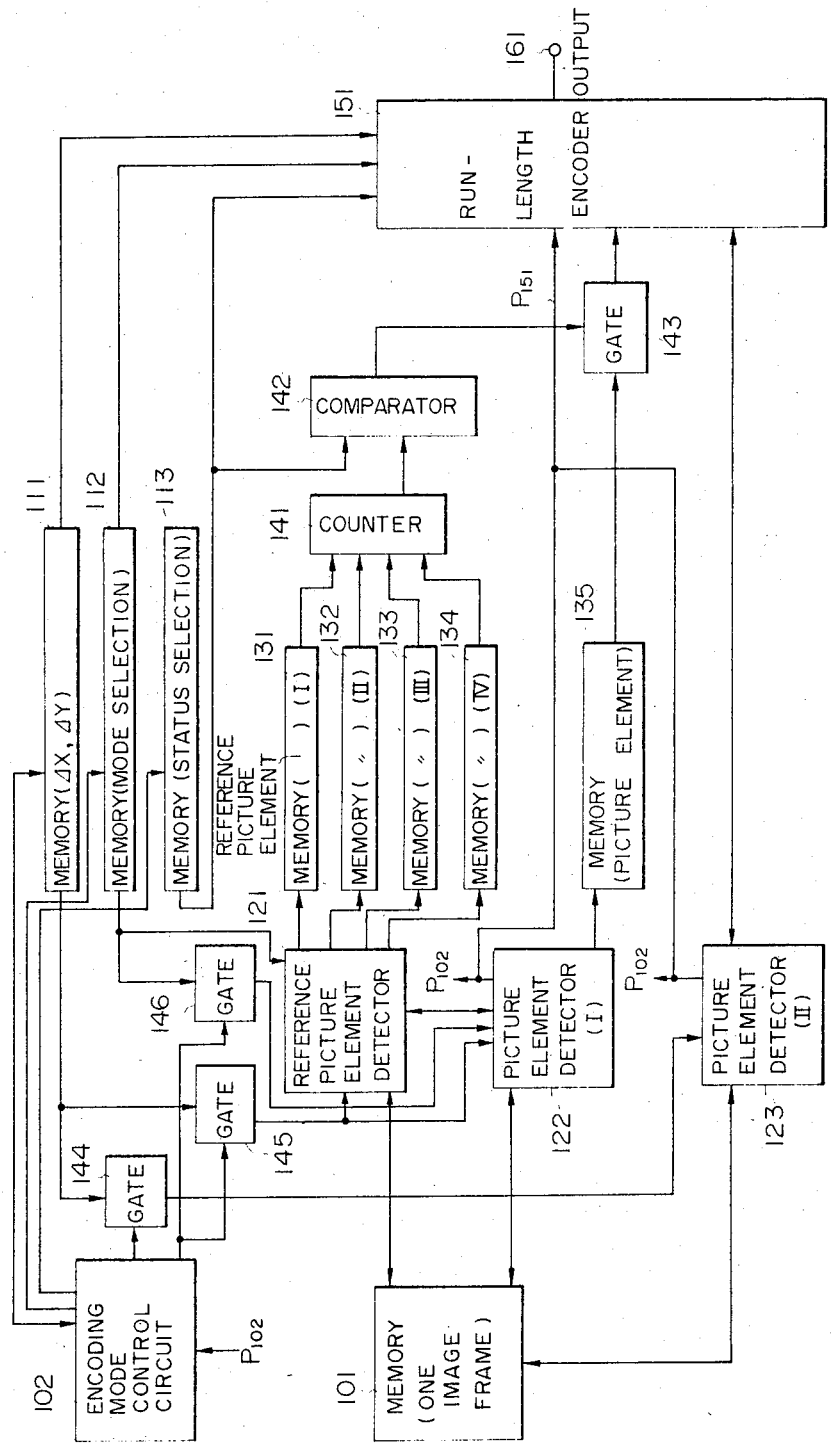
FIG. 8 is a block diagram illustrating an embodiment of the present invention.

FIG. 8 illustrates an example of an encoder. Reference numeral 101 indicates a memory of one image frame; 102 designates an encoding mode control circuit for controlling a code; 111 identifies a memory for storing the values of ΔX and ΔY; 112 denotes a (mode selection) memory; 113 represents a (status selection) memory; 121 shows a reference picture element detector for detecting the values of four reference picture elements from the one image frame memory 101; 122 and 123 refer to picture element detectors for detecting from the (one image frame) memory 101 the values of picture elements to be encoded; 131, 132, 133 and 134 signify memories for storing the four reference picture elements; 135 indicates a memory for storing the value of a picture element to be encoded; 141 designates a counter for counting the total sum of the values of the four reference picture elements; 142 identifies a comparator for comparing a signal from the (status selection) memory 113 with the content of the counter 141; 143, 144, 145 and 146 denote gates; 151 represents a run-length encoder; and 161 shows an output terminal.

The following will describe in detail the operation of the circuit shown in FIG. 8. An image to be encoded is stored, as an initial state, in the (one image frame) memory 101. At this time, a white picture element is represented by a "0" and a black picture element by a "1". Furthermore, the encoding mode control circuit 102 stores the values of first ΔX and ΔY in the (ΔX, ΔY) memory 111, a "0" in the (mode selection) memory 112 and a "0" in the (status selection) memory 113.

The operation starts with the encoding by Procedure 1-2 in such a manner as follows: The encoding mode control circuit 102 opens the gate 144. The content of the (ΔX,ΔY) memory 111 is transferred to the picture element detector 122. The picture element detector 122 successively reads out from the (one image frame) memory 101 the values of picture elements which are to be encoded by Procedure 1-2 and, transfers them to the run-length encoder 151. The run-length encoder 151 determines the use of Table 1 (the code table which is used in Procedure 1-2), since the signals from the (mode selection) memory 112 and the (status selection) memory 113 are both "0", and further, it determines, on the basis of the values of ΔX and ΔY from the ΔX, ΔY memory 111 and Table 1, which code table is to be used for run-length encoding, thereafter encoding picture signals which are sent from the picture element detector 122.

Upon completion of the extraction of all the picture elements to be encoded, the picture element detector 122 provides a signal on each of input lines $P_{151}$ and $P_{102}$ of the run-length encoder 151 and the encoding mode control circuit 102. Upon reception of the signal from the input line $P_{151}$, the run-length encoder 151 performs an encoding ending process. On the other hand, the encoding mode control circuit 102 verifies, by the reception of the signal from the input line $P_{102}$, that the encoding process by Procedure 1-2 has been finished, and then performs the encoding by Procedure 2-1. At first, it closes the gate 144 and provides a "1" to the (mode selection) memory 112 and a "2" to the (state selection) memory 113, thereafter opening the gates 145 and 146.

By receiving the values of ΔX and ΔY from the (ΔX, ΔY) memory 111 and a "1" from the (mode selection) memory 112, the picture element detector 122 reads out picture elements of the mode 1 (see FIG. 1) from the (one image frame) memory 101 in a sequential order (from left to right and from top to bottom) and transfers them to the (picture element) memory 135. By receiving the values of ΔX and ΔY and a "1" from the (mode selection) memory 112, the reference picture element detector 121 similarly receives the picture element values of four picture elements of the mode 1 (see FIG. 1) from the (one picture frame) memory 101 in succession and transfers them to the reference picture element memories 131 to 134. The two detectors 121 and 122 operate in synchronism with each other so that the four reference picture elements extracted by the reference picture element detector 121 become reference picture elements for the picture element which is detected by the picture element detector (I) 122 at that time. The counter 144 summates the contents of the four (reference picture element) memories 131, 132, 133 and 134 and provides the result of summation to the comparator 142. The comparator 142 compares the content of the counter 142 with the content of the status select memory 113 and, only in the case of coincidence therebetween, opens the gate 143. Upon opening of the gate 143, the contents stored in the (picture element) memory 135 are transferred to the run-length encoder 151. The run-length encoder 151 encodes into run-length codes the picture elements which are applied thereto via the gate 143. The code table which is used in this case is determined through the use of Table 6 on the basis of the contents of $\Delta X$ and $\Delta Y$ from the ($\Delta X$, $\Delta Y$) memory 111, the value of the mode from the (mode selection) memory 112 and the status value from the status select memory 113. The encoded signals are output from the output terminal 161.

Upon completion of the detection of all picture elements to be encoded, a signal is provided on each of the input lines $P_{151}$ and $P_{102}$ of the run-length encoder 15 and the encoding mode control circuit 102. When supplied with the signal from the input line $P_{151}$, the run-length encoder 151 performs an encoding completion process. By receiving the signal from the input line $P_{102}$, the encoding mode control circuit 102 is notified of the end of the encoding process of Procedure 2-1 and closes the gates 145 and 146. Next, encoding by Procedure 2-2 is carried out. After transferring a "1" to the (mode selection) memory 112 and a "3" to the (status selection) memory 113, the encoding mode control circuit 102 opens the gates 145 and 146. The subsequent operations are the same as in the case of encoding by Procedure 2-1.

Thereafter encoding by Procedures 2-4 to 2-10 is effected in a similar manner. In the respective procedures, however, the contents of the (mode selection) memory 112 and the (status selection) memory 113 are set as follows:

Procedure 2-3: "1" the content of the mode selection memory 112; and "4" the content of the status selection memory 113

Procedure 2-4: "1" the content of the mode selection memory 112; and "4" the content of the status selection memory 113

Procedure 2-5: "1" the content of the mode selection memory 112; and "0" the content of the status selection memory 113

Procedure 2-6: "2" the content of the mode selection memory 112; and "2" the content of the status selection memory 113

Procedure 2-7: "2" the content of the mode selection memory 112; and "3" the content of the status selection memory 113

Procedure 2-8: "2" the content of the mode selection memory 112; and "1" the content of the status selection memory 113

Procedure 2-9: "2" the content of the mode selection memory 112; and "5" the content of the status selection memory 113

Procedure 2-10: "2" the content of the mode selection memory 112; and "0" the content of the status selection memory 113

After completion of the encoding by Procedure 2-10, if the contents of $\Delta X$ and $\Delta Y$ stored in the ($\Delta X$, $\Delta Y$) memory 111 are not "1s", then the encoding mode control circuit 102 modifies the contents of $\Delta X$ and $\Delta Y$ in the ($\Delta X$, $\Delta Y$) memory 111 to $\Delta X/2$ and $\Delta Y/2$, respectively, and then repeats the encoding by Procedures 2-1 to 2-10. When the contents of the $\Delta X$ and $\Delta Y$ in the ($\Delta X$, $\Delta Y$) memory 111 are both "1", the encoding is finished.

Figure 9:
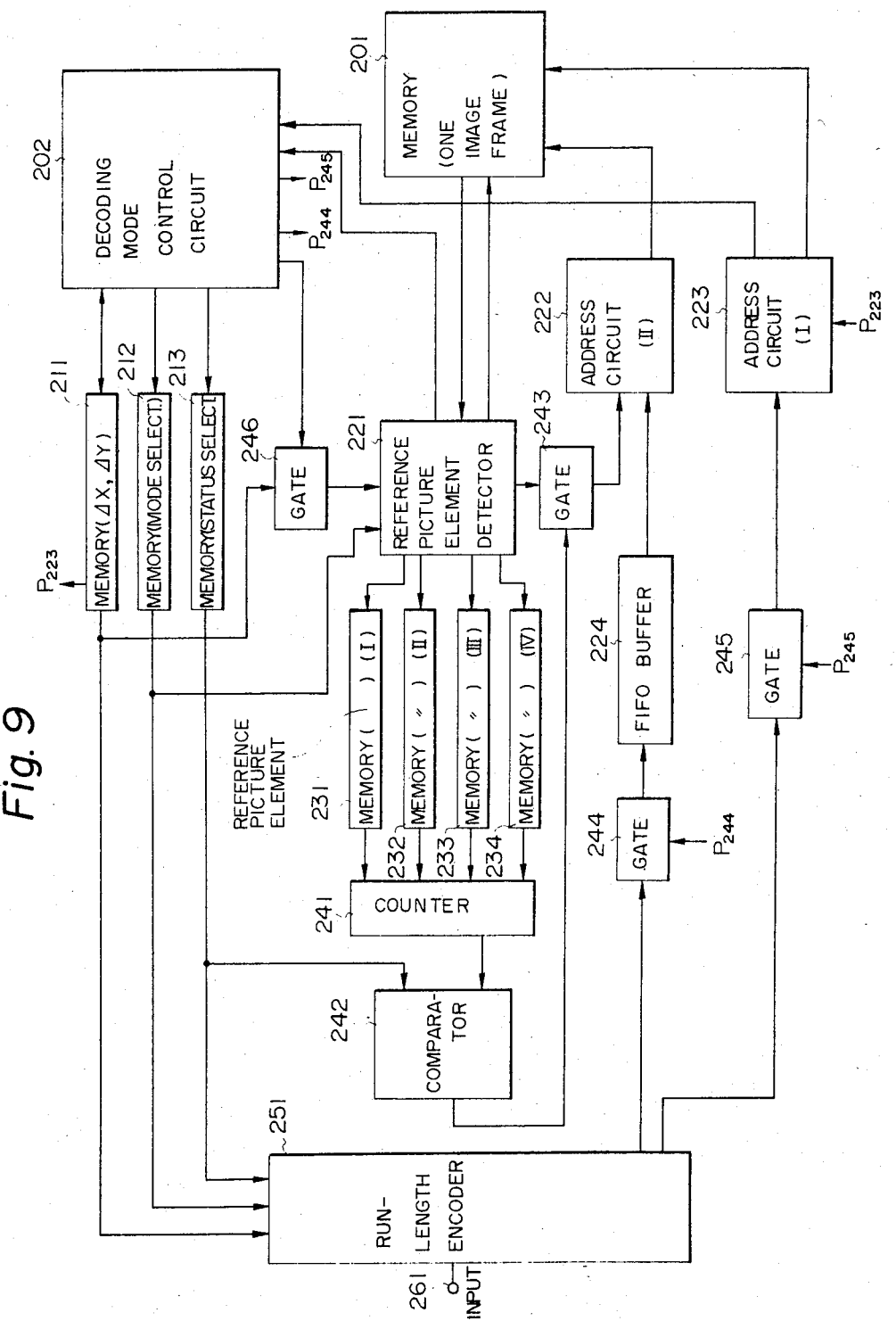
FIG. 9 is a block diagram illustrating an example of a decoding circuit for the signal encoded by the present invention.

FIG. 9 illustrates an example of a decoder. Reference numeral 201 indicates a (one image frame) memory for storing a decoded picture; 202 designates a decoding mode control circuit for controlling the decoding operation; 211 identifies a ($\Delta X$, $\Delta Y$) memory for storing the values of $\Delta X$ and $\Delta Y$; 212 denotes a (mode selection) memory; 213 represents a (status selection) memory; 221 shows a reference picture element detector for detecting four reference picture elements from the (one picture frame) memory; 222 and 223 refer to address circuits for determining addresses of picture elements to be decoded; 224 signifies a FIFO (First IN First OUT) buffer; 231, 232, 233 and 234 indicate memories for storing values of the four reference picture elements; 241 designates a counter for summating the values of the four reference picture elements; 242 identifies a comparator for comparing the contents of the counter 241 with the (status selection) memory 213; 246, 243, 244 and 245 denote gate circuits; 251 represents a run-length encoder; and 261 shows an input terminal.

A detailed description will be given of FIG. 9. In its initial state, the decoding mode control circuit 202 transfers predetermined values of $\Delta X$ and $\Delta Y$ (initial values of $\Delta X$ and $\Delta Y$ used for encoding) to the ( $\Delta X$, $\Delta Y$) memory 211, a "0" to the (mode selection) memory 212 and a "0" to the (status selection) memory 213. The memories 211, 212 and 213 store the values. Further, the decoding mode control circuit 202 opens the gate 245 via an output line $P_{245}$. The encoded signal is applied to the input terminal 261. The run-length encoder 251 determines the use of Table 1 since the signals from the (mode selection) memory 212 and the (status selection) memory 213 are both "0", and further, it determines, on the basis of the values of $\Delta X$ and $\Delta Y$ from the ($\Delta X$, $\Delta Y$) memory 211 and Table 1, which code table is to be used for run-length decoding, thereafter decoding the encoded signal applied from the input terminal 261. The decoded signal is transferred via the gate 245 to the decoded picture element address circuit (I) 223. The decoded picture element address circuit (I) 223 receives the contents of $\Delta X$ and $\Delta Y$ from the ($\Delta X$, $\Delta Y$) memory 211 and transfers the signals, received via the gate 245, to all picture elements [P(N×$\Delta X$+1, M×$\Delta Y$+1), (N, M=0, 1, 2, ... )]which are located at addresses spaced $\Delta X$ and $\Delta Y$ apart in the lateral and vertical directions, respectively, starting at the leftmost address on the uppermost line of the (one image frame) memory 201. Upon completion of the above operations for the entire image frame, the decoded picture element address determining circuit (I) 223 provides an end signal to the decoding mode control circuit 202. At this point of time, picture elements encoded by Procedure 1-2 are all decoded. When supplied with the signal from the decoded picture element address circuit (I) 223, the decoding mode control circuit 202 closes the gate 245. Next, picture elements encoded by Procedure 2-1 are decoded. The decoding mode control circuit 202 transfers a "1" to the (mode selection) memory 212 and a "2" to the (status selection) memory 213 and then opens the gates 244 and 246. The run-length encoder receives the values of $\Delta X$ and $\Delta Y$ from the ($\Delta X$, $\Delta Y$) memory 211, the value of a mode (a "1" in the case of decoding the picture elements encoded by Procedure 2-1) from the (mode selection) memory 212 and the status value (a "2" in the case of decoding the picture elements encoded by Procedure 2-1) from the (status selection) memory 213 and, on the basis of Table 6, determines the code table to be used and performs the decoding of run-lengths of required lengths. The decoded signals are transferred via the gate 244 to the FIFO buffer 224. The reference picture element detector 221 receives the values of $\Delta X$ and $\Delta Y$ via the gate 242 from the ($\Delta X$, $\Delta Y$) memory 211 and a "1" from the (mode selection) memory 212 and, on the basis of the values thus received, sequentially reads out of the (one image frame) memory 201 (from left to right and top to bottom) the values of four picture elements of the mode 1 (see FIG. 1) and transfers them to the four reference picture element memories 231 to 234, respectively. The reference picture element memories 231 to 234 store the picture element values provided from the reference picture element detector 221 and then provide them to the counter 241. The counter 241 computes the total sum of the contents of the four (reference picture element) memories 231, 232, 233 and 234 and applies the count value to the comparator 242. The comparator 242 compares the value transferred from the counter 241 with the values from the (status selection) memory 213 and, in the case of coincidence therebetween, opens the gate 243. Only when the gate 243 is opened, the decoded picture element address circuit 222 receives the addresses of the decoded picture elements from the reference picture element detector 221 and, after reading out one picture element value from the FIFO buffer, writes the picture element value in the (one image frame) memory at an address specified by the reference picture element extractor 221. Upon completion of the above-said procedure for the entire image frame, the reference picture element detector 221 provides to the decoding mode control circuit 202 a signal indicating that the decoding of picture elements encoded by Procedure 2-1 has been completed. Then the decoding mode control circuit 202 transfers a "1" to the (mode selection) memory 212 and a "3" to the status selection memory 213 for initiating the decoding of the picture elements encoded by Procedure 2-2. The subsequent operation is the same as in the case of the decoding of the picture elements encoded by Procedure 2-1.

Thereafter, the decoding of the picture elements encoded by Procedures 2-3 to 2-10 is performed similarly. In the respective decoding, however, the contents of the (mode selection) memory 212 and (status selection) memory 213 are set as follows:

Decoding of picture elements encoded by procedure 2-3: "1" the content of the (mode selection) memory 212; and "1" the content of the (status selection) memory 213.

Decoding of picture elements encoded by Procedure 2-4: "1" the content of the (mode selection) memory 212; and "4" the content of the (status selection) memory 213.

Decoding of picture elements encoded by Procedure 2-5: "1" the content of the (mode selection) memory 212; and "0" the content of the (status selection) memory 213.

Decoding of picture elements encoded by Procedure 2-6: "2" the content of the (mode selection) memory 212; and "2" the content of the (status selection) memory 213.

Decoding of picture elements encoded by Procedure 2-7: "2" the content of the (mode selection) memory; and "3" the content of the (status selection) memory.

Decoding of picture elements encoded by Procedure 2-8: "2" the content of the (mode selection) memory; and "1" the content of the (status selection) memory.

Decoding of picture elements encoded by Procedure 2-9: "2" the content of the (mode selection) memory; and "5" the content of the (status selection) memory.

Decoding of picture elements encoded by Procedure 2-10: "2" the content of the (mode selection) memory; and "0" the content of the (status selection) memory.

After the above decoding, if the contents of $\Delta X$ and $\Delta Y$ in the ($\Delta X$, $\Delta Y$) memory 202 are not "1", then the decoding mode control circuit 202 modifies the contents of $\Delta X$ and $\Delta Y$ in the ($\Delta X$, $\Delta Y$) memory 111 to $\Delta X/2$ and $\Delta Y/2$, respectively, thereafter repeating the procedures of decoding the picture elements encoded by Procedures 2-1 to 2-10.

If the contents of $\Delta X$ and $\Delta Y$ in the ($\Delta X$, $\Delta Y$) memory 211 are both "1", then the decoding is finished.

The foregoing description has been given of an embodiment of the present invention, and the sequence of Procedures 2-1 to 2-10 is not limited specifically to the above-described sequence but the sequence of Procedures 2-1 to 2-5 and the sequence of Procedures 2-6 to 2-10 can be changed.

Furthermore, for encoding concerned picture elements by Procedure 1-2 and Procedures 2-1 to 2-10, it is possible to employ any one of known coding systems instead of using the run-length coding system.

As has been described in the foregoing, according to the facsimile signal coding system of the present invention, it is possible to improve the picture quality rapidly relative to the transmission time and to reduce the transmission time for providing a complete picture; accordingly, the present invention is extremely effective for conversational facsimile communication and facsimile communication which performs an image data base retrieval and so forth.

What we claim is:

1. A facsimile signal coding system, comprising:
   initial encoding means for detecting, from picture elements forming a facsimile picture signal, picture elements at intervals of $\Delta X$ picture elements on every $\Delta Y$th line and for encoding the detected picture elements;
   encoding means of mode 1 associated with the initial encoding means for encoding, by referring to four reference picture elements of the picture elements encoded by the initial encoding means, a picture element surrounded by the four reference picture elements and lying centrally thereof;
   encoding means of mode 2 associated with the initial encoding means and the encoding means of mode 1 for encoding, by referring to four picture elements encoded by the initial encoding means and the encoding means of mode 1, a picture element surrounded by the four picture elements lying above, below, left and right the instant picture element to be encoded; and
   means associated with the initial encoding means, the encoding of mode 1 and encoding means of mode 2 to control them so that the initial encoding and the encoding of mode 1 and 2 are effected using $2^n$ (where n is an integer) as an initial value of each of the ΔX and ΔY and thereafter the encoding operation of mode 1 and mode 2 are repeated with the values of the ΔX and ΔY reduced by half up to obtaining a condition where n is equal to one.

2. A facsimile signal coding method, including the steps of:

detecting, from picture element forming a facsimile picture signal, picture elements at intervals of ΔX picture elements on every ΔYth line and initially encoding the detected picture elements;

mode 1 encoding, by referring to four reference picture elements of the picture elements encoded by the initial encoding, a picture element surrounded by the four reference picture elements and lying centrally thereof;

mode 2 encoding, by referring to four picture elements encoded by the initial encoding means and the encoding means of mode 1, a picture element surrounded by the four picture elements lying above, below, left and right the instant picture element to be encoded; and controlling so that the initial encoding, the mode 1 encoding and mode 2 encoding are effected using $2^n$ (where n is an integer) as an initial value of each of the ΔX and ΔY and thereafter the encoding operations of mode 1 and mode 2 are repeated with the values of the ΔX and ΔY reduced by half up to obtaining a condition where n is equal to one.

* * * * *